United States Patent
Manor

[19]

[11] Patent Number: 6,127,801
[45] Date of Patent: Oct. 3, 2000

[54] BATTERY PACK ASSEMBLY

[75] Inventor: Dror Manor, Herzelia, Israel

[73] Assignee: Techtium Ltd., Israel

[21] Appl. No.: 09/026,878

[22] Filed: Feb. 19, 1998

[30] Foreign Application Priority Data

Jun. 29, 1997 [IL] Israel ......................................... 121189

[51] Int. Cl.[7] ..................................................... H02J 7/00
[52] U.S. Cl. ........................... 320/112; 320/114; 320/128; 307/66
[58] Field of Search ...................................... 320/112, 113, 320/114, 128; 323/222–224; 363/89, 60, 142; 307/60

[56] References Cited

U.S. PATENT DOCUMENTS

| 5,218,284 | 6/1993 | Burns et al. . | |
| 5,440,179 | 8/1995 | Severinsky | 307/66 |
| 5,525,888 | 6/1996 | Toya . | |
| 5,534,765 | 7/1996 | Kreisinger et al. . | |
| 5,592,064 | 1/1997 | Morita . | |
| 5,661,392 | 8/1997 | Imazeki . | |

FOREIGN PATENT DOCUMENTS

| 2270793 | 3/1994 | United Kingdom . |
| 9501692 | 1/1995 | WIPO . |
| 9515017 | 6/1995 | WIPO . |

*Primary Examiner*—Shawn Riley
*Assistant Examiner*—Gregory J Toatley, Jr.
*Attorney, Agent, or Firm*—Ostrolenk, Faber, Gerb & Soffen, LLP

[57] ABSTRACT

This invention discloses a battery pack assembly for use with hand-held electronic equipment including a base unit which is mechanically and electrically compatible with the hand-held electronic equipment, and which comprises battery adaptor circuitry but does not comprise a battery, and a separate battery pack unit which is removably mountable on the base unit and is mechanically and electrically compatible therewith for providing electrical power to the hand-held electronic equipment.

24 Claims, 4 Drawing Sheets

BATTERY PACK ASSEMBLY

FIELD OF THE INVENTION

The present invention relates to battery pack assemblies for portable electronic devices, such as cellular telephones.

BACKGROUND OF THE INVENTION

Various types of rechargeable battery packs are known for use with hand-held electronic equipment such as video camcorders, notebook computers and especially cellular telephones. The vast majority of such battery packs use either Lithium cells, or nickel-cadmium or nickel-metal hydride cells. The battery packs may be provided with voltage control and protective circuitry for ensuring correct charging and discharging conditions to permit proper operation of the battery in conjunction with the electronic equipment.

Battery packs containing nickel-based cells generally contain the number of cells required to provide the operating voltage for the equipment, and there is therefore no necessity for voltage conversion circuits, but only for over-temperature and short-circuit current protection circuits. In battery packs containing Lithium cells, voltage conversion and control circuitry are not usually incorporated. However, Lithium cell battery packs must include voltage and current protection devices in addition to the standard components contained in Nickel-based cells.

Battery packs were often provided in the past as a single unit incorporating the batteries together with its associated circuitry. A more recent trend has been to install these circuits within the equipment, and to limit the electronic circuitry contained in the battery pack itself to basic protection for over-temperature and short-circuit only.

There is a marked lack of standardization with battery packs. Even in a single product area, such as that of cellular telephones, each battery pack is generally designed for a specific manufacturer and for specific models made by each manufacturer. As a result, both because of the market-driven factors of manufacturer/model specificity of the various battery packs and the more limited production quantities for each type, and because of the additional production expense of incorporating any electronic circuitry, the cost of such battery packs is high.

Furthermore, since the majority of such electronic equipment is designed to operate at voltages which are high, such as 3.6 volts, 4.8 volts and 6 volts, in comparison with the 1.2 volt single cell voltage of the generally used nickel cadmium (NiCd) or nickel metal hydride (NiMH) cells, most conventional battery packs utilize 5 cells to provide the necessary working voltage, as mentioned above. They are therefore large, both in size and in weight.

As a result of the high cost and the low convenience of the above mentioned prior art battery packs, many users do not carry spare battery packs with hand-held electronic devices. This is especially true for cellular telephones, as they are often carried constantly on the user's person.

There are known in the prior art several examples of battery charging circuits designed for integral use with rechargeable battery packs. In U.S. Pat. No. 5,218,284, a switching regulator circuit optimizes the charging rate and regulates current flow to the load.

In GB Patent No. 2,270,793, a DC—DC converter is used for stabilizing the voltage supply of a Lithium cell battery pack as the cells become progressively more discharged in use.

GB Patent No. 2,285,188 describes a power management system for a battery recharging circuit, wherein a charge regulator circuit controls the rate of charge of the battery.

A battery charger having an electronic switch for controlling charge and discharge is disclosed in PCT patent application WO 9515017, and enables conditioning of the battery, improvement in performance and lifetime, and monitoring of the battery temperature.

The battery pack control circuits designed for cellular telephone use are different from those used for other portable electronic equipment, in that they generally include a stand-by circuit, operational when the mobile phone is on but not being used. The most recent circuits of this type are "burst control circuits", so called because they are quiescent for most of the time, but turn themselves on for a very short "burst" of time at regular intervals, in order to check whether a transmission is being received. They typically turn on to check for transmission every few milliseconds, and with a typical duty ratio of 5%. The average current consumption of such a burst control circuit is therefore very low. The battery life whilst the phone is not in use is largely dependent on the effectiveness of this circuit.

Burst control circuits are currently implemented using dedicated commercially available IC's. However, such prior art burst control circuits have a disadvantage in that they are not bi-directional. Consequently, they cannot be used with voltage control circuits, such as those described in the prior art, which are used for controlling both the charging and discharging cycles of a battery pack. This is a major disadvantage for use in rechargeable battery packs for cellular phones.

None of the prior art battery pack control circuits are thus able to provide two way DC voltage multiplication, both during charging and discharging cycles, so that a battery with a different number of cells than required for operating the portable device will be seen both to the charger and to the load as if it had the correct number of cells, and at the same time, provide a long stand-by battery lifetime by virtue of including an effective two way burst control circuit.

SUMMARY OF THE INVENTION

The present invention seeks to provide an improved rechargeable battery pack for use with hand-held electronic equipment, such as cellular telephones, which is lightweight, compact, low cost, efficient, and is of a standardized size such that it is suitable for mounting in the battery packs of a variety of hand-held electronic equipment.

There is thus provided in accordance with a preferred embodiment of the present invention a battery pack assembly for use with hand-held electronic equipment, such as cellular telephones, including a base unit which is mechanically and electrically compatible with the hand-held electronic equipment, and which includes battery adaptor circuitry but does not include a battery, and a separate battery pack unit which is removably mountable on the base unit and is mechanically and electrically compatible therewith for providing electrical power to the hand-held electronic equipment.

Additionally in accordance with another preferred embodiment of the present invention, there is provided for use with a battery pack assembly base unit which is mechanically and electrically compatible with hand-held electronic equipment, and which includes battery adaptor circuitry but does not include a battery, a separate battery pack unit which is removably mountable on the base unit and is mechanically and electrically compatible therewith for providing electrical power to the hand-held electronic equipment.

In accordance with yet another preferred embodiment of the present invention, there is provided a battery pack unit including a number of cells different to the number required to additively provide the correct working voltage of the hand-held electronic equipment.

Furthermore, in accordance with yet another preferred embodiment of the present invention, the battery pack unit which is removably mountable on the base unit, is of a standardized size such that it is suitable for mounting in the battery packs of a variety of hand-held electronic equipment.

In accordance with a further preferred embodiment of the present invention, there is provided a battery pack which does not include adaptor circuitry for powering the hand-held electronic equipment.

Additionally, in accordance with yet another preferred embodiment of the present invention, the battery pack assembly base unit includes converter circuitry operative to provide dc voltage multiplication to match the output voltage of the batteries to the operating voltage of hand-held electronic equipment, both when the battery is being charged by the main source of electrical power, and when the battery is powering the hand-held electronic equipment, and including a burst control circuit for providing long stand-by operation, which is operative both during charge and discharge cycles.

In accordance with still a further preferred embodiment of the present invention, both the base unit and the battery pack unit include mutual identification elements which are operative to ensure that only battery pack units having predetermined characteristics can be used with a given base unit. The predetermined characteristics may be selected from mechanical and electrical characteristics.

In accordance with yet another preferred embodiment of the present invention, there is provided an electronic circuit operative for maintaining a low stand-by current drain from the battery of mobile communications equipment when in waiting mode to receive a transmission, and operative together with circuitry to control the battery voltage both during charge and discharge of the battery.

In accordance with still another preferred embodiment of the present invention, there is provided an electronic circuit operative for maintaining a low stand-by current drain from the battery of mobile communications equipment when in waiting mode to receive a transmission, and operative together with circuitry to provide dc voltage multiplication to match the output voltage of the batteries to the operating voltage of the mobile communications equipment when the battery is being charged by the main source of electrical power, and when the battery is powering the mobile communications equipment.

Additionally, in accordance with yet another preferred embodiment of the present invention, there is provided apparatus as described above and also containing an electronic circuit operative for maintaining a low stand-by current drain from the battery when in a waiting mode to receive a transmission, and operative together with circuitry to control the battery voltage both during charge and discharge of the battery.

In accordance with still another preferred embodiment of the present invention, there is further provided apparatus as described above and containing also an electronic circuit operative to maintain a low stand-by current drain from the battery when in a waiting mode to receive a transmission, and operative together with circuitry to provide dc voltage multiplication to match the output voltage of the batteries to the operating voltage of the mobile communications equipment when the battery is being charged by the main source of electrical power, and when the battery is powering the mobile communications equipment.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
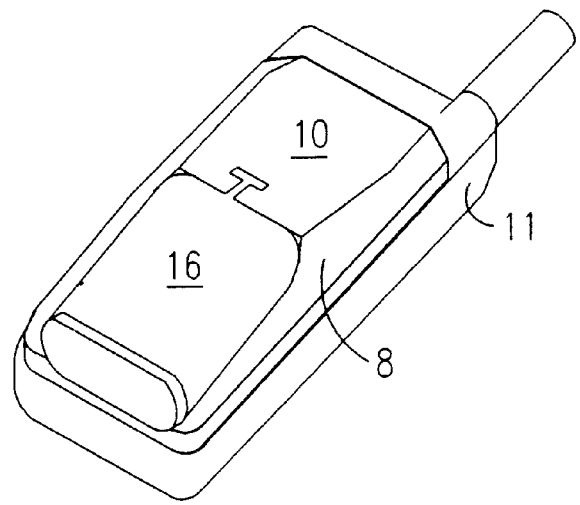
FIG. 1 is a pictorial illustration of a battery pack assembly constructed and operative in accordance with a preferred embodiment of the present invention in operative engagement with a cellular telephone.
Figure 2:
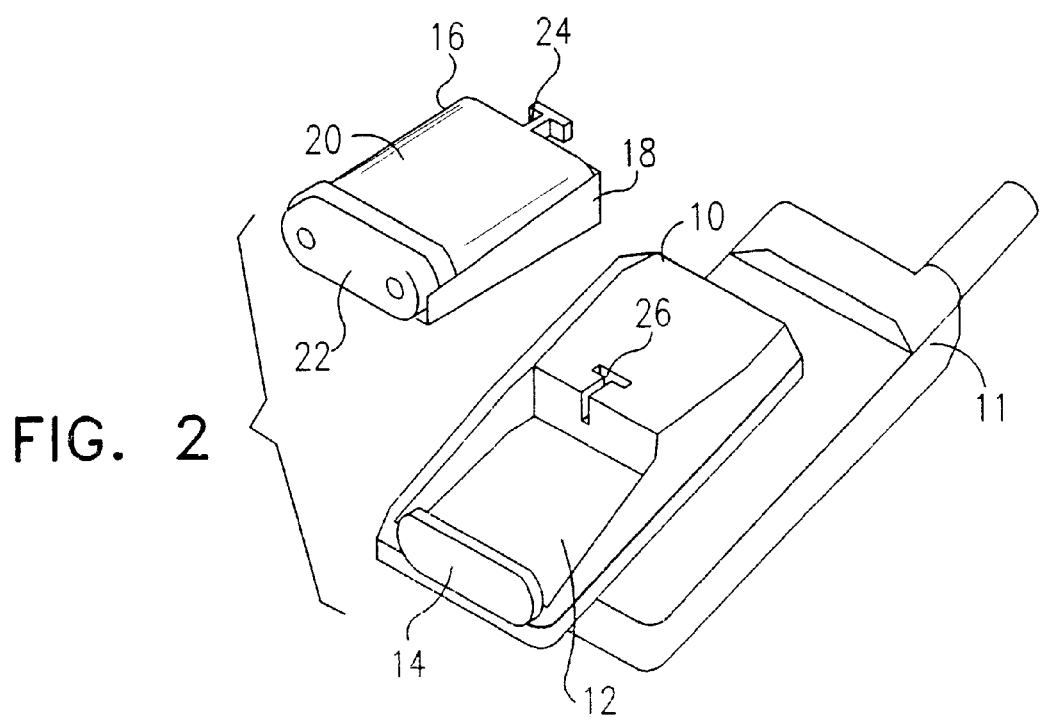
FIG. 2 is a pictorial illustration of the battery pack assembly of FIG. 1 in a disassembled orientation, showing the separate battery pack unit, the base unit and the cellular telephone, constructed and operative in accordance with a preferred embodiment of the present invention.

Reference is now made to FIG. 1 and FIG. 2, which illustrate a battery pack assembly 8 constructed and operative in accordance with a preferred embodiment of the present invention, in operative engagement with a cellular telephone 11. The battery pack assembly includes a base unit 10, having a mechanical structure which makes it adaptable for operative engagement with hand-held electronic equipment, such as a cellular telephone 11. It is appreciated that various different types of base units 10 may be provided, to adapt to various configurations of hand-held electronic equipment, each having its own mechanical and electrical characteristics and requirements.

In accordance with a preferred embodiment of the present invention, the base unit 10 includes voltage adaptor circuitry and various types of protective circuitry for use both during powering of the hand-held electronic equipment by the battery pack assembly and also during charging of the battery pack. Preferably, the base unit 10 does not include any battery.

The base unit includes a socket 12 for receiving a separate battery pack unit 16. The socket 12 is equipped with electrical contacts 14 for operational engagement with the battery pack unit 16.

Arranged for removable and replaceable mounting in socket 12 and in operational engagement with electrical contacts 14 is a battery pack unit 16 comprising a housing 18 and a plurality of batteries 20 which are mechanically connected to contacts 22 which, when the battery pack unit 16 is seated in socket 12, contact electrical contacts 14.

The battery pack unit 16 is provided with a specially shaped mechanical protrusion 24 which comes into operative engagement with a suitably shaped keyway slot 26 located in the base unit, together acting as mechanical mutual identification elements operative to ensure that only battery pack units having predetermined mechanical characteristics can be used with a given base unit.

Figure 3:
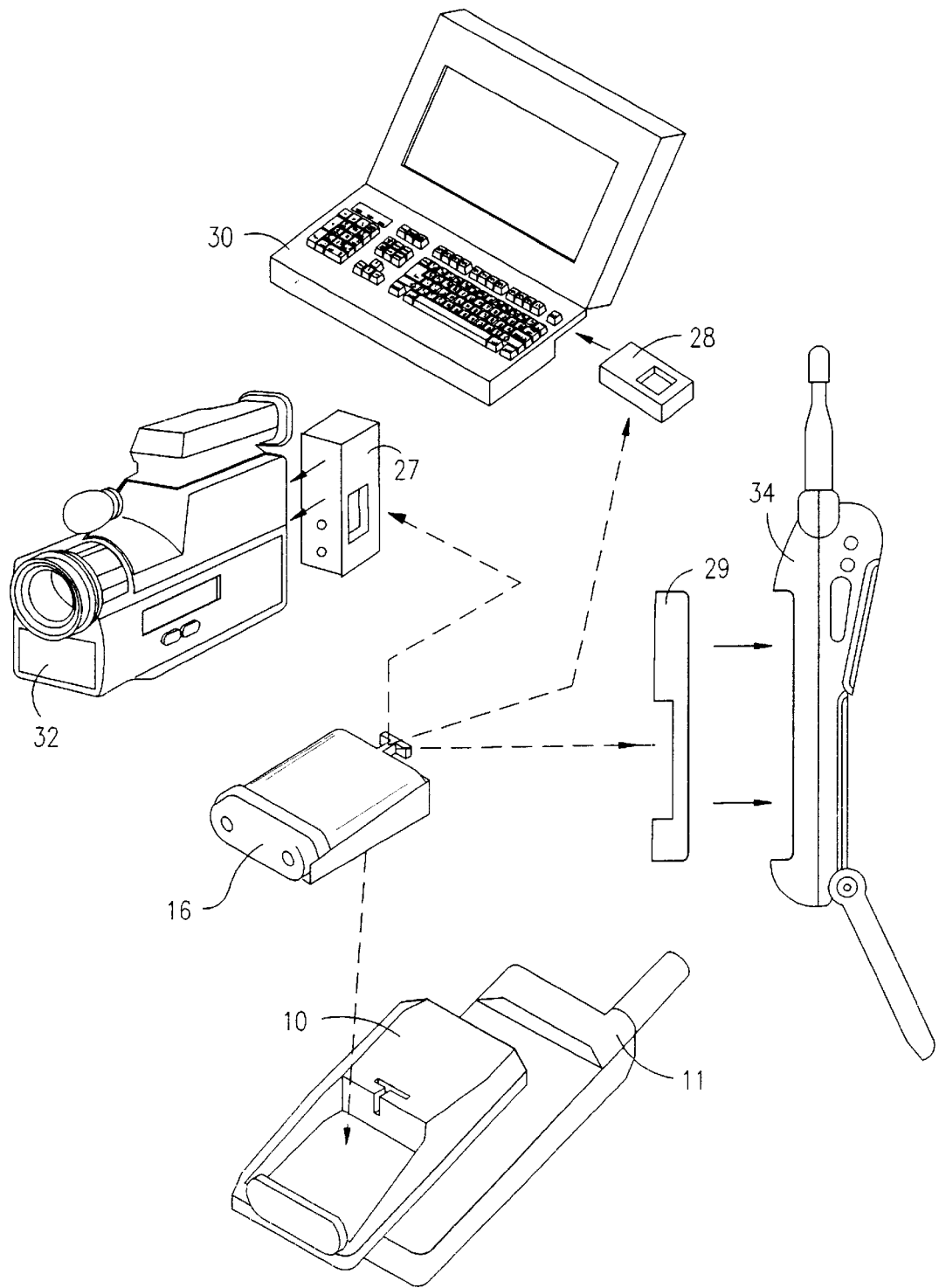
FIG. 3 illustrates the use of a single type of battery pack unit for installation in different types of base units suitable for a plurality of portable electronic pieces of equipment, namely a laptop computer, a video camcorder and two different models of cellular telephones, constructed and operative in accordance with a preferred embodiment of the present invention.

The use of a separate battery pack unit facilitates the standardization on a small number of battery pack units for a wide range of portable electronic equipment. FIG. 3 illustrates the use of a single type of battery pack unit 16, suitable for installation in the base units 10, 27, 28, 29, of a number of different portable electronic pieces of equipment, namely a laptop computer 30, a video camcorder 32 and two different models of cellular telephones 11, 34.

The number of batteries comprising the battery pack unit is different from the number required to additively provide the operating voltage of the cellular telephone. A cellular phone typically operates at a voltage of 6 volts, whereas the battery pack unit is typically equipped with only two cells, providing an output voltage of 2.4 volts if Nickel Cadmium or Nickel Metal Hydride cells are used.

The use of a small number of cells has specific advantages over the use of the larger number of cells needed to provide the fill operating voltage of the cellular phone, in this example, 5 cells. The cost of 2 cells is lower than the cost of a larger number of cells of the same capacity. In addition, the capacity per unit volume of each cell increases with the cell size. Therefore, two cells with a specific capacity take up less volume and weigh less than 5 cells of the same total capacity. A two celled battery pack unit is therefore both less costly and less bulky than a 5 cell battery pack unit with corresponding capacity. In order to use such a battery pack with a higher voltage cellular phone, voltage adapter circuitry is fitted in the base unit to provide bi-directional voltage multiplication in addition to the control functions generally required by rechargeable battery operated equipment.

Figure 4:
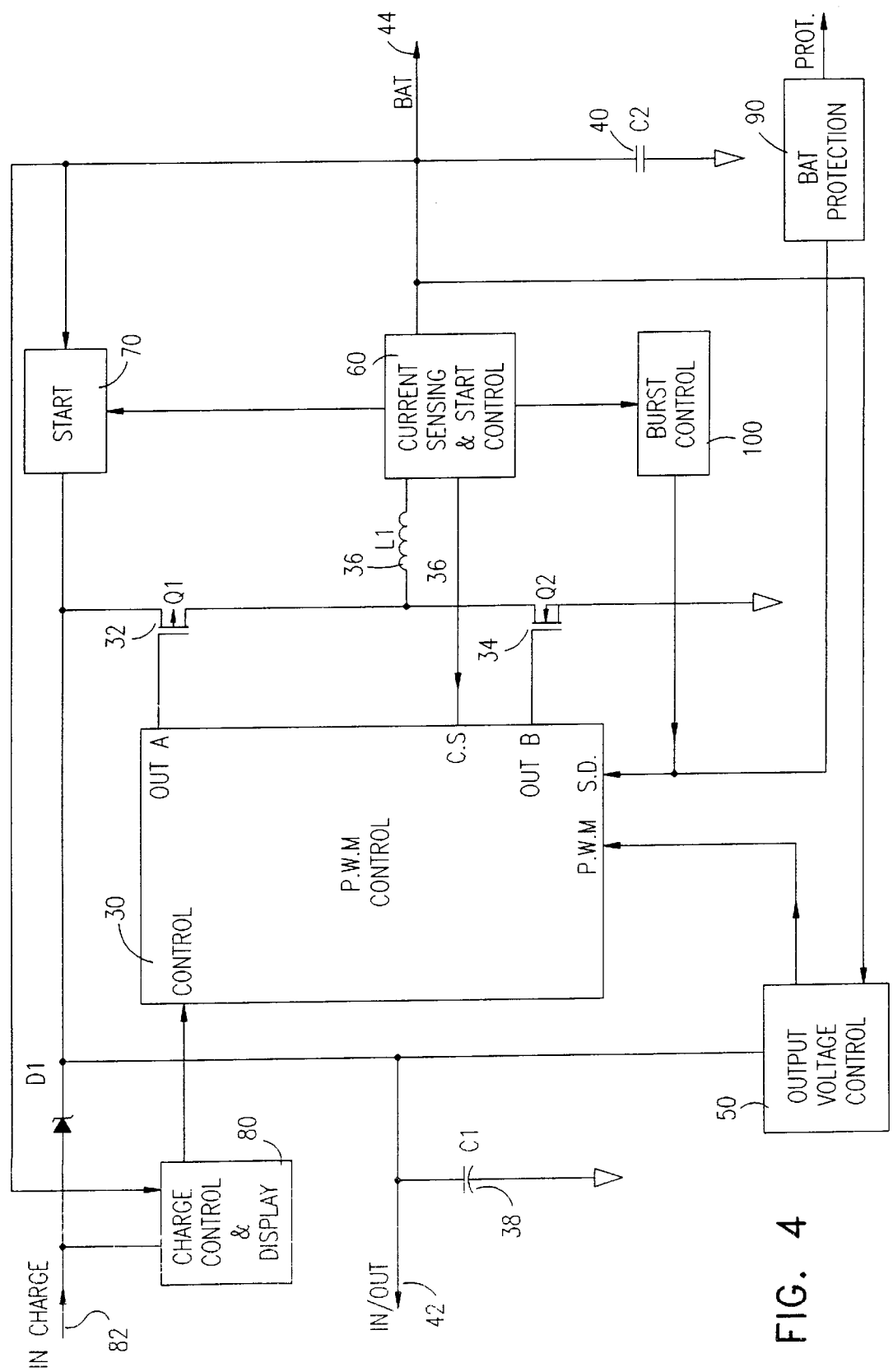
FIG. 4 is a block diagram illustration of the electronic function of the base unit and separate battery pack unit constructed and operative in accordance with an embodiment of the present invention.

Reference is now made to FIG. 4, which shows a schematic block diagram of a preferred embodiment of the voltage adaptor circuitry and various types of protective circuitry included in the base unit of the battery pack assembly, constructed and operated in accordance with the current invention.

Block 30 acts as a DC/DC bi-directional converter, allowing bi-directional current flow, such that it acts as a voltage step-up converter in one direction and as a voltage step-down converter in the other direction. It contains the voltage conversion control circuits which comprise a pulse-width modulation (PWM) controller, acting as a synchronous switching regulator, and providing the pulses for driving a pair of alternately switched FET's Q1 and Q2, 32 and 34 respectively, arranged in a half-bridge converter with inductor L1 36, which acts as an energy storage device.

During a charging (discharging) period, while FET Q1 is switched on, L1 is operative to accumulate (release) energy, and during a discharging (charging) period, when the polarity is reversed and FET Q2 is switched on, inductor L1 acts as a current source and develops a voltage on capacitor C1 38 (C2 40). Continuous switching operation enables transfer of energy in either direction between capacitors C1 and C2. The ratio of the turn-on times of each of FET's Q1 and Q2 establishes the ratio of the voltages developed on capacitors C1 and C2 at the IN/OUT 42 or BAT 44 terminals respectively.

During normal use of the cellular telephone, or other electronic equipment in which the battery pack assembly is installed, the bi-directional converter supplies the correct voltage at the IN/OUT port 42 to the load. During charging operation, the bi-directional converter supplies the correct voltage at the BAT terminal 44 to the batteries.

Block 50 contains the output voltage control circuit, which controls the output voltage on terminal IN/OUT 42, and is operative to maintain a fixed ratio between the voltage of the battery and the output voltage. This circuit inputs its control signal to the bi-directional converter 30 through pin PWM.

Current sensing and start control circuitry is represented by block 60. These circuits fulfill the following functions:
  (a) They limit the maximum current allowed to flow through the cells
  (b) During charge or discharge of the cells, the current is sensed by these circuits and a signal inputted to the bi-directional converter 30 via pin C.S.
  (c) They control the operation of the Start circuit 70, and limit its operation to times when there is no charge or discharge current flowing.

The Start circuit 70, supplies operating voltage to all the other circuits, and the output voltage when the two cells are connected. Without the start circuit, the low voltage of the two cells would be insufficient to operate the circuits. This circuit provides the voltage until charge or discharge of the cells is detected. The current consumption of the circuits during the waiting period is thus very low.

The charge control and display circuitry is denoted by block 80. These circuits allow the cells to be charged through a special charging input 82. By means of these circuits, the cells can be safely charged at either a high rate, or at an optimal rate. The charging rate is inputted to the bi-directional converter via the CONTROL pin.

The battery protection unit, as denoted by block 90, contains circuitry which interrogates the electronic code in the battery pack unit to be installed in the base unit and prevents the base unit from operating with an unauthorized battery pack unit. This circuit controls the operation of the bi-directional converter via a signal inputted through the shutdown pin S.D.

The burst control circuitry is represented by block 100. This circuit functions as a bi-directional stand-by circuit, operative to conserve battery energy when neither charge or discharge conditions prevail, i.e. when neither battery or charging voltage is present at IN/OUT terminal 42. The burst control circuit allows a burst of operation of the bi-directional converter 30, for a very short time, typically 100 to 200 microseconds, at regular intervals, typically every few milliseconds, in order to maintain a voltage at the IN/OUT terminal 42, and to check whether a transmission is being received. The duty ratio is thus typically of the order of 5%. In between operational periods, the bi-directional converter 30 is shut down by inputting a control signal to its terminal S.D. Trickle current drain of the battery is thus reduced while the battery is not loaded, thereby ensuring a low average current consumption and a long battery life whilst the phone is on, but not in use.

Figure 5:
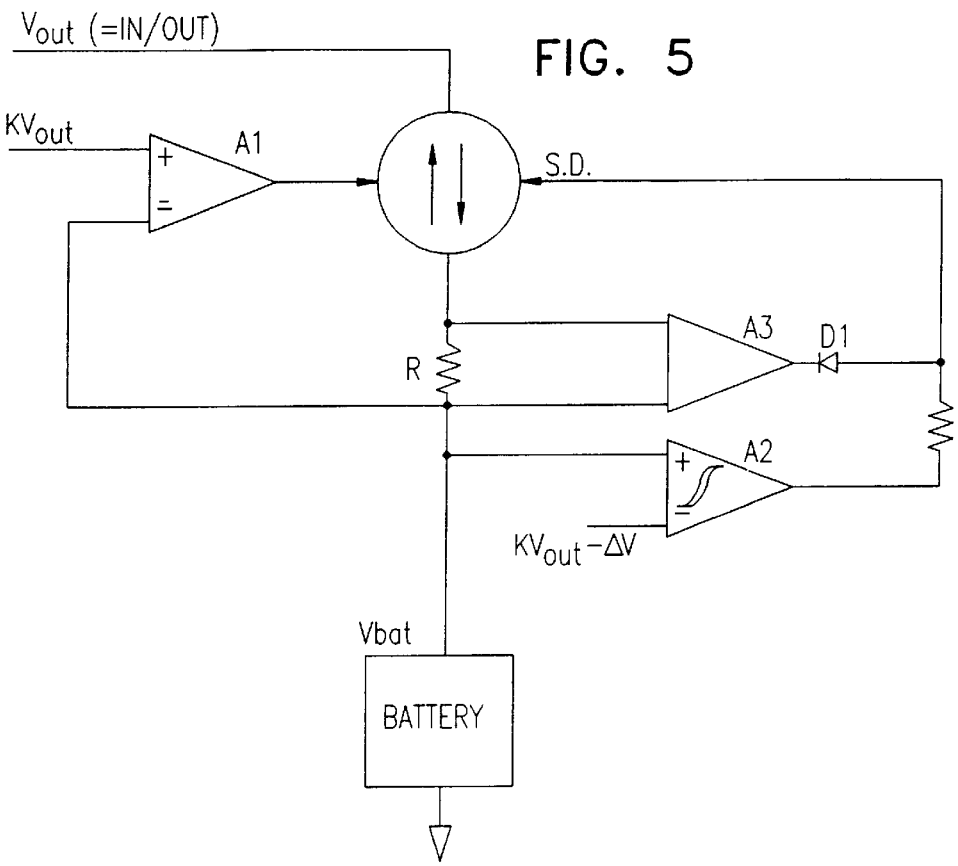
FIG. 5 is a schematic circuit diagram of the burst control circuit incorporated in FIG. 4, constructed and operative in accordance with an embodiment of the present invention.

Reference is now made to FIG. 5, which shows the circuit elements and operational principles of a burst control circuit constructed and operative in accordance with the present invention.

During normal operation, comparator A1 is operative to maintain the correct operating voltage, whether during charge or discharge, as explained in the functional description of the output voltage control circuitry, block 50 in FIG. 4. The voltage at the input to comparator A2 maintains the output of A2 on, and would be operative to cause a shut down signal at the S.D input of the bi-directional converter, if not for the hold off voltage through diode D1, which is held in a conducting state as a result of the low output of comparator A3, whose input senses the current flow through R. When the load current falls, as occurs, for instance, when a transmission ends, the current through resistor R falls to below a specified level (the current sensing control 60 of FIG. 4 detects this level). The output of A3 then goes high, turning diode D1 off, thereby allowing the high output of A2 to send a shut down signal to terminal S.D of the PWM control. As a result, $V_{out}$ begins to drop towards zero. When it falls to less than a predetermined increment $\Delta V$ below the battery voltage $V_{bat}$, comparator A2 switches off, the shut down control signal goes to zero, allowing the bi-directional converter to turn on again. The output voltage therefore begins to rise again, until it climbs to a level above the internal hysteresis level of the comparator A2, which then turns on again, and starts the whole process over again.

This process continues until a high current demand is made by the load, for instance, when a transmission is commenced. Comparator A3 then detects the high current through resistor R, pulls the diode D1 on again, and prevents the shut down signal from operating.

In the prior art circuits, which use rising output voltage as the parameter for determining when to enter burst mode control, it is necessary to limit the minimum current to a higher than zero value, in order to maintain sensitivity to voltage changes. Therefore, such circuits cannot be used for the bi-directional current control proposed in the present invention, since they can never operate around the change-over point of zero current between charge and discharge modes. The circuit described in the present invention, because it senses current levels, is able to operate for currents flowing in both directions, and in particular, for currents passing through the zero value.

Figure 6:
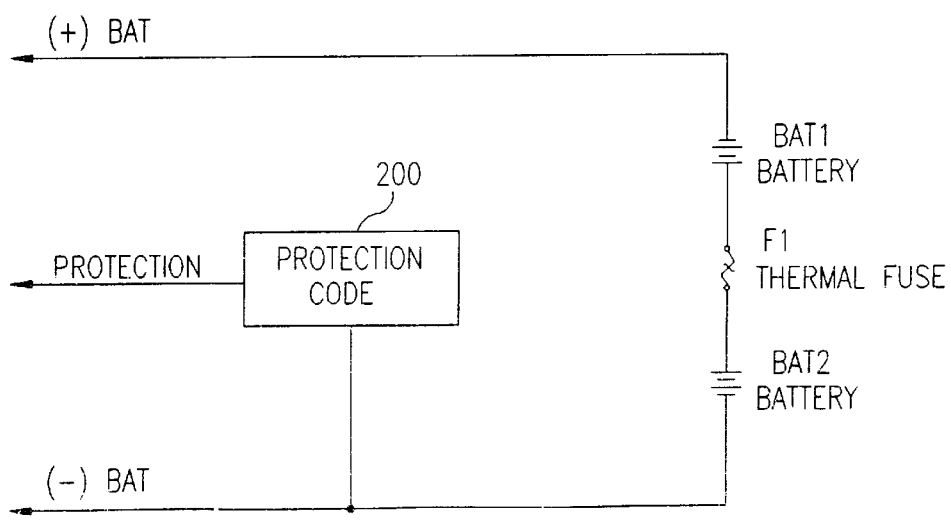
FIG. 6 is a block diagram illustration of a battery pack unit circuit, constructed and operative in accordance with another embodiment of the present invention, showing a coded device which provides electrical identification to the battery protection unit contained in the base unit.

Reference is now made to FIG. 6, which shows the battery pack unit circuit in schematic form. The protection code unit 200 contains a coded device which provides identification to the battery protection unit contained in the base unit. This, together with the battery protection unit in the base unit, constitute the electrical mutual identification elements operative to ensure that only battery pack units having predetermined electrical characteristics can be used with a given base unit.

It will be appreciated by persons skilled in the art that the present invention is not limited by what has been particularly shown and described hereinabove. Rather the scope of the present invention includes both combinations and sub-combinations of the various features described hereinabove as well as variations and further developments thereof which would occur to persons skilled in the art upon reading the foregoing description and which are not in the prior art.

I claim:

1. A battery pack assembly for use with hand-held electronic equipment including a base unit which is mechanically and electrically compatible with the hand-held electronic equipment, and which comprises battery adaptor circuitry but does not comprise a battery, and a separate battery pack unit which is removably mountable on the base unit and is mechanically and electrically compatible therewith for providing electrical power to the hand-held electronic equipment said battery pack unit comprising a number of cells different from the number of cells required to additively provide the correct working voltage of said hand-held electronic equipment.

2. Apparatus according to claim 1, and wherein the battery pack does not comprise adaptor circuitry for powering the hand-held electronic equipment.

3. Apparatus according to claim 1, and wherein the battery pack does not comprise adaptor circuitry for charging the battery pack cells.

4. Apparatus according to claim 1, and wherein the battery pack assembly base unit comprises converter circuitry operative to provide dc voltage multiplication to match the output voltage of the batteries to the operating voltage of the hand-held electronic equipment when the battery is being charged by the mains source of electrical power, and when the battery is powering hand-held electronic equipment.

5. Apparatus according to claim 1, and wherein the battery pack unit which is removably mountable on the base unit is of a standardized size such that it is suitable for mounting in the battery packs of a variety of hand-held electronic equipment.

6. Apparatus according to claim 1, and wherein both the base unit and the battery pack unit comprise mutual identification elements which are operative to ensure that only battery pack units having predetermined characteristics can be used with a given base unit.

7. Apparatus according to claim 6, and wherein the predetermined characteristics are mechanical characteristics.

8. Apparatus according to claim 6, and wherein the predetermined characteristics are electrical characteristics.

9. Apparatus according to claim 1, and wherein the hand-held electronic equipment is a mobile communications device, such as a cellular telephone.

10. A battery pack unit which is removably mountable in a battery pack assembly base unit and is mechanically and electrically compatible therewith for providing electrical power to hand-held electronic equipment, said battery pack assembly base unit being mechanically and electrically compatible with said hand-held electronic equipment and comprising battery adaptor circuitry but not comprising a battery said battery pack unit comprising a number of cells different from the number of cells required to additively provide the correct working voltage of said hand-held electronic equipment.

11. Apparatus according to claim 10, and wherein the battery pack does not comprise adaptor circuitry for powering, the hand-held electronic equipment.

12. Apparatus according to claim 10, and wherein the battery pack does not comprise adaptor circuitry for charging the battery pack cells.

13. Apparatus according to claim 10, and wherein the battery pack assembly base unit comprises converter circuitry operative to provide dc voltage multiplication to match the output voltage of the batteries to the operating voltage of the hand-held electronic equipment when the battery is being charged by the mains source of electrical power, and when the battery is powering hand-held electronic equipment.

14. Apparatus according to claim 10, and wherein the battery pack unit which is removably mountable on the base unit is of a standardized size such that it is suitable for mounting in the battery packs of a variety of hand-held electronic equipment.

15. Apparatus according to claim 10, and wherein both the base unit and the battery pack unit comprise mutual identification elements which are operative to ensure that only battery pack units having predetermined characteristics can be used with a given base unit.

16. Apparatus according to claim 15, and wherein the predetermined characteristics are mechanical characteristics.

17. Apparatus according to claim 15, and wherein the predetermined characteristics are electrical characteristics.

18. Apparatus according to claim 10, and wherein the hand-held electronic equipment is a mobile communications device, such as a cellular telephone.

19. An electronic circuit operative for maintaining a low stand-by current drain from the battery of mobile communications equipment when in waiting mode to receive a transmission, and operative together with circuitry to control the battery voltage both during charge and discharge of the battery.

20. An electronic circuit operative for maintaining a low stand-by current drain from the battery of mobile communications equipment when in waiting mode to receive a transmission, and operative together with circuitry to provide dc voltage multiplication to match the output voltage of the batteries to the operating voltage of the mobile communications equipment when the battery is being charged by the mains source of electrical power, and when the battery is powering the mobile communications equipment.

21. A battery pack assembly for use with mobile communications equipment including a base unit which is mechanically and electrically compatible with the mobile communications equipment, and which comprises battery adaptor circuitry but does not comprise a battery, and a separate battery pack unit which is removably mountable on the base unit and is mechanically and electrically compatible therewith for providing electrical power to the mobile communications equipment, wherein said battery adaptor circuitry comprises an electronic circuit operative for maintaining a low stand-by current drain from the battery when in a waiting mode to receive a transmission, and is operative together with circuitry to control the battery voltage both during charge and discharge of the battery.

22. Apparatus according to claim 21, and wherein said circuitry to control the battery voltage provides dc voltage multiplication to match the output voltage of the batteries to the operating voltage of the mobile communications equipment when the battery is being charged by the mains source of electrical power, and when the battery is powering the mobile communications equipment.

23. A battery pack unit which is removably mountable in a battery pack assembly base unit and is mechanically and electrically compatible therewith for providing electrical power to mobile communications equipment, said battery pack assembly base unit being mechanically and electrically compatible with said mobile communications equipment and comprising battery adaptor circuitry but not comprising a battery, wherein said battery adaptor circuitry comprises an electronic circuit operative for maintaining a low stand-by current drain from the battery when in a waiting mode to receive a transmission, and is operative together with circuitry to control the battery voltage both during charge and discharge of the battery.

24. Apparatus according to claim 23, and wherein said circuitry to control the battery voltage provides dc voltage multiplication to match the output voltage of the batteries to the operating voltage of the mobile communications equipment when the battery is being charged by the mains source of electrical power, and when the battery is powering the mobile communications equipment.

* * * * *